(12) United States Patent
Yun et al.

(10) Patent No.: US 11,182,078 B2
(45) Date of Patent: Nov. 23, 2021

(54) METHOD OF ACCESSING A DATA STORAGE DEVICE USING A MULTI-ACCESS COMMAND

(71) Applicant: Samsung Electronics Co., Ltd., Suwon-si (KR)

(72) Inventors: Eun Jin Yun, Seoul (KR); Sil Wan Chang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 84 days.

(21) Appl. No.: 16/656,221

(22) Filed: Oct. 17, 2019

(65) Prior Publication Data

US 2020/0050363 A1    Feb. 13, 2020

Related U.S. Application Data

(63) Continuation of application No. 15/436,296, filed on Feb. 17, 2017, now Pat. No. 10,481,799.

(30) Foreign Application Priority Data

Mar. 25, 2016   (KR) ........................ 10-2016-0036386

(51) Int. Cl.
*G06F 3/06*          (2006.01)
(52) U.S. Cl.
CPC ............ *G06F 3/061* (2013.01); *G06F 3/0659* (2013.01); *G06F 3/0679* (2013.01); *G06F 3/0688* (2013.01)
(58) Field of Classification Search
CPC ...... G06F 3/0604; G06F 3/061; G06F 3/0638; G06F 3/0659; G06F 3/0679;

(Continued)

(56) References Cited

U.S. PATENT DOCUMENTS 6,317,805 B1    11/2001    Chilton et al.
6,505,268 B1    1/2003    Schultz et al.
(Continued)

FOREIGN PATENT DOCUMENTS

CN      101017460 A    8/2007
CN      103942010 A    7/2014
(Continued)

OTHER PUBLICATIONS

Resnick et al., "Proposing an Abstracted Interface and Protocol for Computer Systems." Jul. 7, 2014, pp. 1-10.

(Continued)

*Primary Examiner* — Larry T Mackall
(74) *Attorney, Agent, or Firm* — Muir Patent Law, PLLC

(57) ABSTRACT

A data storage device and a method of operating the same are provided. The data storage device includes a first non-volatile memory device, a second non-volatile memory device, and a management module. The management module receives a multi-access command including first and second physical addresses which are different from each other from a host, generates and sends a first access command including the first physical address to the first non-volatile memory device, and generates and sends a second access command including the second physical address to the second non-volatile memory device. The data storage device performs the first and second access commands on the first and second physical addresses, respectively.

22 Claims, 17 Drawing Sheets

(58) Field of Classification Search
CPC .. G06F 3/0688; G06F 3/0652; G06F 9/30043; G06F 12/0246; G06F 12/0692; G06F 12/1684
See application file for complete search history.

(56) References Cited

U.S. PATENT DOCUMENTS

| | | | |
|---|---|---|---|
| 8,307,151 B1 | 11/2012 | Caraccio et al. | |
| 8,489,852 B2 | 7/2013 | Jo et al. | |
| 8,650,362 B2 | 2/2014 | De la Iglesia et al. | |
| 8,954,662 B2 | 2/2015 | Han et al. | |
| 8,966,580 B2 | 2/2015 | Sela et al. | |
| 9,063,903 B2 | 6/2015 | Sukegawa | |
| 2005/0289218 A1 | 12/2005 | Rothman et al. | |
| 2006/0262608 A1 | 11/2006 | Babb et al. | |
| 2008/0320214 A1* | 12/2008 | Ma | G06F 12/0246 711/103 |
| 2009/0006745 A1 | 1/2009 | Cavallo et al. | |
| 2010/0229032 A1 | 9/2010 | Lee | |
| 2011/0022783 A1 | 1/2011 | Moshayedi | |
| 2011/0093659 A1 | 4/2011 | Jo et al. | |
| 2012/0084484 A1 | 4/2012 | Post et al. | |
| 2012/0144134 A1* | 6/2012 | Niwa | G11C 29/74 711/155 |
| 2012/0173792 A1 | 7/2012 | Lassa et al. | |
| 2014/0281361 A1 | 9/2014 | Park et al. | |
| 2015/0032942 A1 | 1/2015 | De la Iglesia et al. | |
| 2016/0266821 A1 | 9/2016 | Sathyanarayan et al. | |
| 2018/0011635 A1 | 1/2018 | Shin | |

FOREIGN PATENT DOCUMENTS

| | | |
|---|---|---|
| CN | 105339913 A | 2/2016 |
| CN | 103176746 B | 4/2017 |
| KR | 10-2010-0100394 A | 9/2010 |
| KR | 10-2014-0031515 A | 3/2014 |

OTHER PUBLICATIONS

Korea Information Science Society, Rhee et al., "Implementation and Performance Analysis of a NAND Controller for ONFI NANO Flash Memory," pp. 135-138, Mar. 2013, KIISE Transactions on Computing Practices (KTCP).

* cited by examiner

& 1

METHOD OF ACCESSING A DATA STORAGE DEVICE USING A MULTI-ACCESS COMMAND

CROSS-REFERENCE TO RELATED APPLICATIONS

This application is a Divisional Application of U.S. patent application Ser. No. 15/436,296, filed on Feb. 17, 2017, which claims priority under 35 U.S.C. § 119(a) to Korean Patent Application No. 10-2016-0036386 filed on Mar. 25, 2016, the disclosures of each of which are hereby incorporated by reference in their entirety.

BACKGROUND

Embodiments of the present disclosure relate to a data storage device, and more particularly, to a data storage device and method for increasing transmission efficiency between a host and the data storage device, and a data processing system including the same.

A storage device having a large capacity usually includes a plurality of memory devices. A memory device is used to store data. Memory devices are divided into volatile memory devices and non-volatile memory devices.

Data duplication or backup is often used to recover data in case of failure in storage devices or in a power supply. Data mirroring is one such data duplication scheme. It is a technique of duplicately storing data in at least one device. A host usually executes a plurality of write commands on a storage device with respect to same data in order to perform data mirroring, or executes a single write command with a single address that is received by the storage device and is translated at the storage device in order to perform duplication. As such, typical data duplication may require a greater number of commands (e.g., twice as many) generated by a host, or may require performing address translation and/or processing at a storage device. Both of these can require additional processing.

SUMMARY

Some embodiments provide a data storage system, method, and device for increasing data efficiency between a host and data storage device and reducing power consumption.

In some embodiments, a data storage device includes a first nonvolatile memory device, a second nonvolatile memory device, and a management circuit connected to the first nonvolatile memory device and the second nonvolatile memory device. The management circuit is configured to: receive an external multi-access command, the external multi-access command received from outside the data storage device and including a first address and a second address, based on the external multi-access command and the first address, generate a first internal access command and supply the first internal access command and the first address to the first nonvolatile memory device, and based on the external multi-access command and the second address, generate a second internal access command and supply the second internal access command and the second address to the second nonvolatile memory device.

In some embodiments, which may include the above or other embodiments, a method of accessing a data storage device includes receiving an external multi-access command at the data storage device from a device external to the data storage device, the external multi-access command includ-

2 ing a first address and a second address; supplying a first access command based on the external multi-access command to a first nonvolatile memory, the first access command including the first address; executing a first access operation on the first nonvolatile memory device using the first access command and the first address; supplying a second access command based on the external multi-access command to a second nonvolatile memory, the second access command including the second address; and executing a second access operation on the second nonvolatile memory device using the second access command and the second address.

In some embodiments, which may include the above or other embodiments, a multi-access method for a data storage device includes initiating a multi-access operation on a host device by generating a multi-access request; performing a mapping operation on the multi-access request to generate a multi-access command, the multi-access command including at least a command type indicator, a duplicate/split flag, and a plurality of addresses; and sending the multi-access command from the host to the data storage device.

In some embodiments, which may include the above or other embodiments, a multi-access method for a data storage device including a management circuit and a plurality of nonvolatile memory devices includes: receiving an external multi-access command from a device external to the data storage device, the external multi-access command including a command type indicator and at least a first address and a second address; transmitting a first internal multi-access command based on the external multi-access command to a first nonvolatile memory device of the data storage device using the first address; transmitting a second internal multi-access command based on the external multi-access command to a second nonvolatile memory device of the data storage device using the second address; accessing the first nonvolatile memory device using the first address; and accessing the second nonvolatile memory device using the second address.

BRIEF DESCRIPTION OF THE DRAWINGS

The above and other features and advantages will become more apparent by describing in detail exemplary embodiments thereof with reference to the attached drawings in which.

Figure 1:
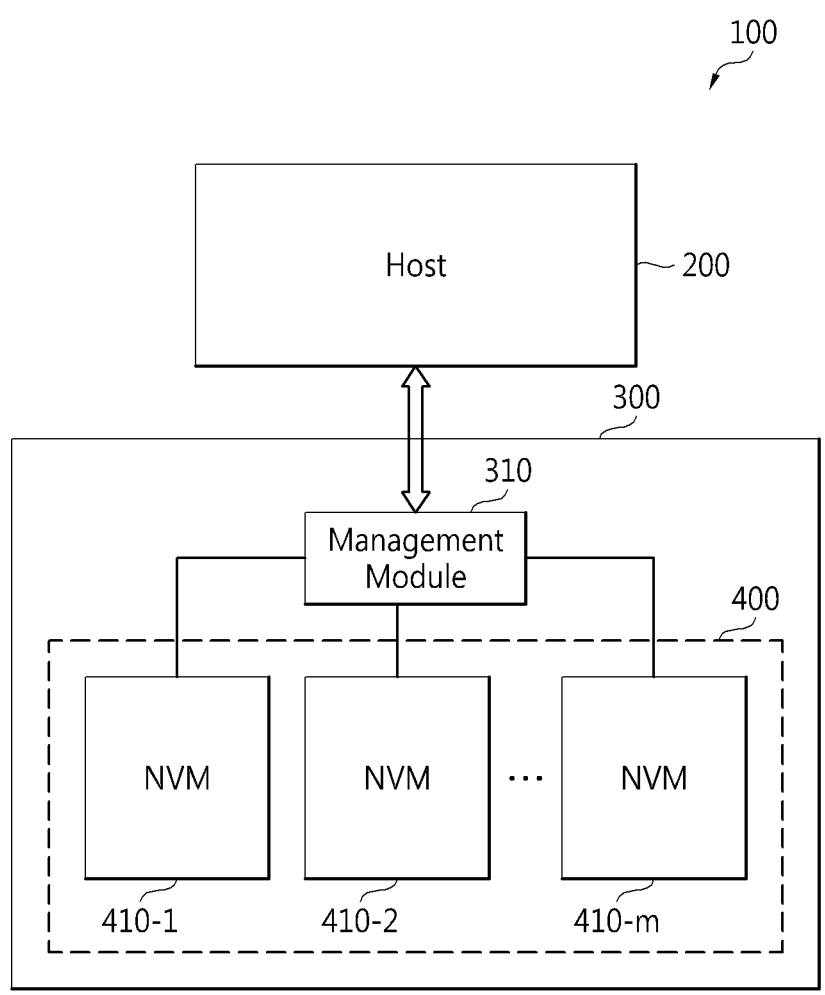
FIG. 1 is a block diagram of a data processing system according to some embodiments.

Like numbers refer to like elements throughout. Though the different figures show variations of exemplary embodiments, and may be referred to using language such as "in one embodiment," these figures are not necessarily intended to be mutually exclusive from each other. Rather, as will be seen from the context of the detailed description below, certain features depicted and described in different figures can be combined with other features from other figures to result in various embodiments, when taking the figures and their description as a whole into consideration.

DETAILED DESCRIPTION

The disclosure now will be described more fully hereinafter with reference to the accompanying drawings, in which embodiments of the invention are shown. This invention may, however, be embodied in many different forms and should not be construed as limited to the embodiments set forth herein.

It will be understood that, although the terms first, second, third etc. may be used herein to describe various elements, components, regions, layers and/or sections, these elements, components, regions, layers and/or sections should not be limited by these terms. Unless the context indicates otherwise, these terms are only used to distinguish one element, component, region, layer or section from another element, component, region, layer or section, for example as a naming convention. Thus, a first element, component, region, layer or section discussed below in one section of the specification could be termed a second element, component, region, layer or section in another section of the specification or in the claims without departing from the teachings of the present invention. In addition, in certain cases, even if a term is not described using "first," "second," etc., in the specification, it may still be referred to as "first" or "second" in a claim in order to distinguish different claimed elements from each other.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, or as "contacting" or "in contact with" another element, there are no intervening elements present. Other words used to describe the relationship between elements should be interpreted in a like fashion (e.g., "between" versus "directly between," "adjacent" versus "directly adjacent," etc.).

Terms such as "same," or "equal," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to emphasize this meaning, unless the context or other statements indicate otherwise. For example, items described as "substantially the same," or "substantially equal," may be exactly the same or equal, or may be the same or equal within acceptable variations that may occur, for example, due to manufacturing or operational processes.

As is traditional in the field of the disclosed technology, features and embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 2:
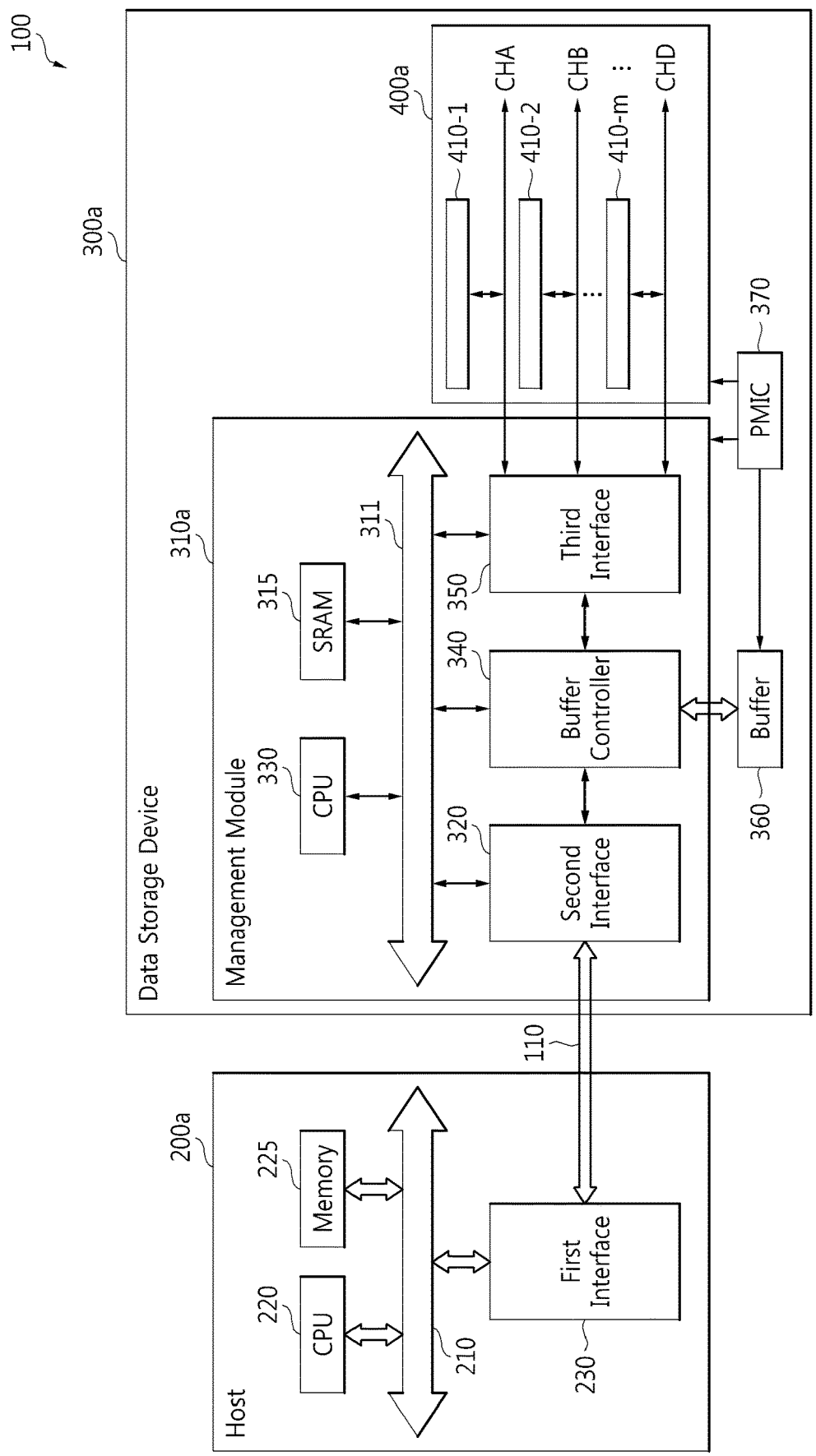
FIG. 2 is a block diagram of a host and a data storage device illustrated in FIG. 1 according to some embodiments.
Figure 3:
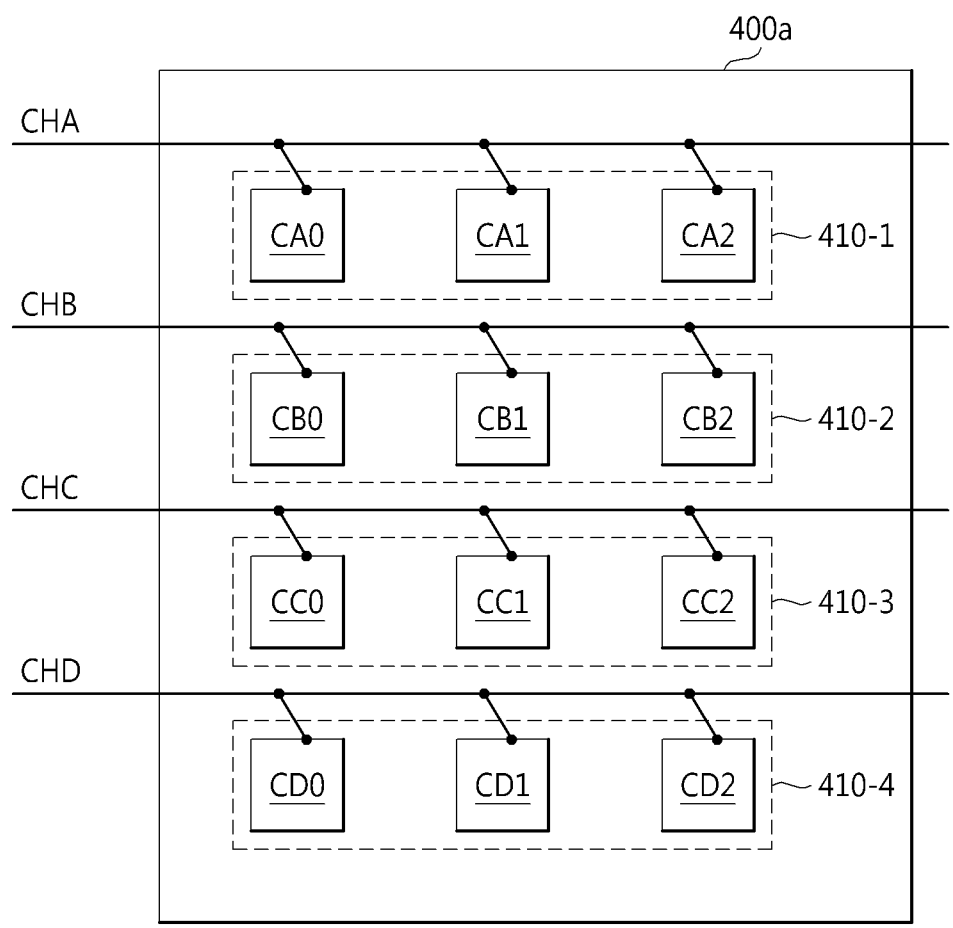
FIG. 3 is a block diagram of a memory device cluster illustrated in FIG. 2 according to some embodiments.

FIG. 1 is a block diagram of a data processing system 100 according to some embodiments. FIG. 2 is a block diagram of a host 200*a* and a data storage device 300*a* illustrated in FIG. 1 according to some embodiments. FIG. 3 is a block diagram of a memory device cluster 400*a* illustrated in FIG. 2 according to some embodiments. It should be noted that certain reference numerals or characters, such as 200 and 200*a*, or 300 or 300*a*, are used in different figures to represent items that may be the same, but may be a different embodiment. Thus, when described in connection with different figures, these different corresponding labels may be used in this specification.

Referring to FIGS. 1 through 3, the data processing system 100 may include the host 200 and the data storage device 300 which may communicate a command and/or data with the host 200 through an interface 110. The data processing system 100 may be implemented, for example, as a personal computer (PC), a workstation, a data center, an interne data center (IDC), a storage area network (SAN), a network attached storage (NAS), or a mobile computing device, but the inventive concept is not restricted to these examples. The mobile computing device may be a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone, or an e-book, but is not restricted thereto.

The interface 110 may be implemented, for example, as a serial advanced technology attachment (SATA) interface, a SATA express (SATAe) interface, a SAS (serial attached small computer system interface (SCSI)), a peripheral component interconnect express (PCIe) interface, a non-volatile memory express (NVMe) interface, an advanced host controller interface (AHCI), or a multimedia card (MMC) interface, but the inventive concept is not restricted to these examples. The interface 110 may transmit electrical signals or optical signals between the host 200 and the data storage device 300.

The host 200 may control a data processing operation (e.g., a write or read operation) of the data storage device 300 through the interface 110. The host 200 may refer to a host controller.

The data storage device 300 may include a management module 310 and a plurality of non-volatile memory (NVM) devices 410-1 through 410-$m$, where "m" is an integer of at least 2. For convenience' sake in the description, the NVM devices 410-1 through 410-$m$ will be called the memory device cluster 400. A data storage device 300$a$ illustrated in FIG. 2 may also include a buffer 360 and a power management integrated circuit (PMIC) 370.

The data storage device 300 may be a non-volatile memory device such as a flash-based memory device or a phase-change random access memory (PRAM) device but it is not restricted to these examples. The data storage device 300 may be implemented, for example, as a solid-state drive or solid-state disk (SSD), an embedded SSD (eSSD), a universal flash storage (UFS), an MMC, an embedded MMC (eMMC), or a managed NAND, but the inventive concept is not restricted to these examples.

In the case where the data storage device 300 includes one or more flash-based memory devices, each flash-based memory device may include a memory cell array. The memory cell array may include a plurality of memory cells. The memory cell array may be a two-dimensional or three-dimensional memory cell array.

The three-dimensional memory cell array may be monolithically formed at one or more physical levels in an array of memory cells having an active region disposed on or above a silicon substrate and may include a circuit related with the operation of the memory cells. The circuit may be formed in, on, or above the silicon substrate. The term "monolithic" means that layers at each level in an array are directly deposited on layers at an underlying level in the array. The three-dimensional memory cell array may include a vertical NAND string which is vertically oriented so that at least one memory cell is placed on or above another memory cell. The at least one memory cell may include a charge trap layer. The following patent documents, which are hereby incorporated by reference in their entirety, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648."

Alternatively, the data storage device 300 may be implemented as a hard disk drive (HDD), a PRAM device, a magnetoresistive RAM (MRAM) device, a spin-transfer torque MRAM (STT-MRAM) device, a ferroelectric RAM (FRAM) device, or a resistive RAM (RRAM) device.

The management module 310, which may include various circuit elements and may include an integrated circuit, may be referred to as a management circuit, and may control transfer or process of a command and/or data transmitted among the host 200 and the NVM devices 410-1 through 410-$m$. In the case where the NVM devices 410-1 to 410-$m$ are NAND devices, the management circuit may be referred to as a NAND management circuit. The management module 310 may be implemented, for example, in an integrated circuit (IC) or a system on chip (SoC). As shown in FIG. 2, host 200$a$ may include a bus architecture 210, a central processing unit (CPU) 220, a memory 225, and a first interface 230. The host 200$a$ may be external to the data storage device 300$a$. The host, 200$a$, including its various components, and the data storage device 300$a$, including its various components, may be configured to perform the various operations and methods described herein.

The CPU 220, the memory 225, and the first interface 230 may communicate a command and/or data with each other via the bus architecture 210. Although the host 200$a$ includes the bus architecture 210, the CPU 220, the memory 225, and the first interface 230 in the embodiments illustrated in FIG. 2, the inventive concept is not restricted to the host 200$a$ illustrated in FIG. 2.

The host 200 may be implemented as an IC, a motherboard, a SoC, an application processor (AP), a mobile AP, a web server, a data server, or a database server, but the inventive concept is not restricted to these examples. The bus architecture 210 may be implemented as an advanced microcontroller bus architecture (AMBA), an advanced high-performance bus (AHB), an advanced peripheral bus (APB), an advanced extensible interface (AXI), an advanced system bus (ASB), AXI coherency extensions (ACE), or a combination thereof, but the inventive concept is not restricted to these examples.

The CPU 220 may generate a write command for controlling a write operation of the data storage device 300, a read command for controlling a read operation of the data storage device 300, or an erase command for controlling an erase operation of the data storage device 300. The write command may include a write address (e.g., a logical address or a physical address). The read command may include a read address (e.g., a logical address or a physical address). The CPU 220 may also generate a multi-write command (N-Write command) for controlling a multi-write operation of the data storage device 300, a multi-read command (N-Read command) for controlling a multi-read operation of the data storage device 300, or a multi-erase command (N-Erase command) for controlling a multi-erase operation of the data storage device 300. Commands generated by the host are herein referred to as external commands in relation to the storage device 300.

For convenience' sake in the description, the N-Write, the N-Read, and the N-Erase commands are each generally referred to as multi-access commands, or external multi-access commands. The external multi-access command is a command that is originally passed between the host 200 and the data storage device 300 in various embodiments, so that a data write, read or erase operation is performed with respect to at least two addresses (e.g., physical addresses) with a single command. For example, the at least two addresses may be associated with and may be transmitted along with a single multi-access command. The multi-access command may include the N-Write, the N-Read, and the N-Erase commands, but the inventive concept is not restricted to these embodiments. Other commands including a plurality of addresses may be described as a multi-access command.

The CPU 220 may include at least one core.

The memory 225 may store data used for the operation of the CPU 220, data to be transmitted to the data storage device 300, or data received from the data storage device 300. The memory 225 may also store flash translation layer (FTL) code which may be executed by the CPU 220. The FTL code may simply be called FTL. An example hierarchy in the host 200 and the FTL will be described in detail below with reference to FIG. 4.

The first interface 230 may change the format of a command and/or data to be transmitted to the data storage device 300 and may transmit the command and/or data in a changed format to the data storage device 300 through the interface 110. The first interface 230 may also change the format of a response and/or data received from the data storage device 300 and may transmit the response and/or data in a changed format to the CPU 220 through the bus architecture 210. For example, the first interface 230 may include a transceiver, which transmits and receives a command and/or data. The structure and operations of the first interface 230 may be configured to be compatible with those of the interface 110.

A management module 310a illustrated in FIG. 2 may include bus architecture 311, an internal memory (e.g., static random access memory (SRAM)) 315, a second interface 320, a CPU 330, a buffer controller 340, and a third interface 350. The bus architecture 311 of the management module 310a may be implemented as AMBA, AHB, APB, AXI, ASB, ACE, or a combination thereof, but the inventive concept is not restricted to these examples.

The internal memory (here SRAM) 315 may store data used for the operations of the management module 310a or data generated from a data processing operation (e.g. a write or read operation) performed by the management module 310a. The internal memory 315 may store a partial code of the FTL which may be executed by the CPU 330. A partial function (or a code for performing the partial function) of the FTL may be implemented in the host 200 and another partial function (or a code for performing the partial function) of the FTL may be implemented in the management module 310a of the data storage device 300. However, in various embodiments described here, the FTL is not fully implemented on the data storage device 300. In some cases, no portion of the FTL is implemented on the data storage device 300.

The internal memory 315 may be implemented as random access memory (RAM), dynamic RAM (DRAM), static RAM (SRAM), buffer, buffer memory, cache, or tightly coupled memory (TCM) but is not restricted to these examples.

The second interface 320 may change the format of a response and/or data to be transmitted to the host 200a and may transmit the response and/or data in a changed format to the host 200a through the interface 110. The second interface 320 may also receive a command and/or data from the host 200a, change the format of the command and/or data, and transmit the command and/or data in a changed format to the CPU 330 and/or the buffer controller 340. The second interface 320 may include a transceiver which transmits and receives a signal and/or data.

The structure and operations of the second interface 320 may be configured to be compatible with those of the interface 110. The second interface 320 may be, for example, a SATA interface, SATAe interface, SAS, PCIe interface, NVMe interface, AHCI, MMC interface, NAND-type flash memory interface, or NOR-type flash memory interface but is not restricted thereto.

The CPU 330 may control the internal memory 315, the second interface 320, the buffer controller 340, and the third interface 350 through the bus architecture 311. The CPU 330 may include at least one core. The CPU 330 may control the PMIC 370.

The buffer controller 340 may write data to or read data from the buffer 360 according to the control of the CPU 330. The buffer controller 340 may be referred to as a controller or a buffer manager which may control the write and read operations on the buffer 360.

The third interface 350 may control a data processing operation (e.g. a write or read operation) on the memory device cluster 400a through channels CHA through CHD according to the control of the CPU 330. The third interface 350 may be, for example, a SATA interface, SATAe interface, SAS, PCIe interface, NVMe interface, AHCI, MMC interface, NAND-type flash memory interface, or NOR-type flash memory interface, but is not restricted thereto.

The buffer 360 may write data received from the host 200 or read data that has been stored according to the control of the buffer controller 340. The buffer 360 may be implemented as volatile memory such as buffer memory, RAM, SRAM, or DRAM, but the disclosure is not restricted to these examples.

When the management module 310 and the buffer 360 are formed in different semiconductor chips, respectively, the management module 310 and the buffer 360 may be implemented in a single package using package-on-package (PoP), multi-chip package (MCP), or system-in package (SiP), but the disclosure is not restricted to these examples. A first chip including the buffer 360 may be stacked above a second chip including the management module 310, for example, using stacking terminals such as bumps or balls.

The PMIC 370 may control operating voltages applied to the management module 310, the buffer 360, and/or the memory device cluster 400a. The first operating voltage applied to the management module 310, the second operating voltage applied to the buffer 360, and the third operating voltage applied to the memory device cluster 400a may be the same as or different from one another.

The memory device cluster 400a illustrated in FIG. 2 may include a plurality of memory devices 410-1 through 410-m which transmit and receive data through the respective channels CHA through CHD. As shown in FIG. 3, the memory devices 410-1 through 410-m may include a plurality of memory elements or memory chips CA0 through CA2, CB0 through CB2, CC0 through CC2, and CD0 through CD2, respectively. Although three memory chips are connected to each of the four channels CHA through CHD in the embodiments illustrated in FIG. 3, the current embodiments are just an example, and the number of channels and the number of memory chips connected to each channel may be changed. Each memory chip may be, for example, a nonvolatile memory chip, such as a NAND memory. As described herein, a semiconductor chip refers to a die formed from a wafer and that includes an integrated circuit thereon. Semiconductor chips can be stacked to form semiconductor devices such as chip stacks and/or semiconductor packages. Semiconductor chips may also be referred to as semiconductor devices.

The memory elements or memory chips CA0 through CA2, CB0 through CB2, CC0 through CC2, or CD0 through CD2 in the memory device 410-1, 410-2, 410-3, or 410-4 may be implemented in a single package or mounted on a single module. Each memory chip may include a plurality of blocks; each of the blocks may include a plurality of pages.

The first memory device 410-1 may be connected to the first channel CHA; the second memory device 410-2 may be connected to the second channel CHB; the m-th memory device 410-m may be connected to the m-th channel CHD. The number of memory devices 410-1 through 410-m and the number of channels may be appropriately determined according to different situations. The number of memory chips or memory elements in each of the memory devices 410-1 through 410-m may also be appropriately determined according to different situations.

A channel as used herein may refer to an independent data path which exists between the management module 310, e.g., the third interface 350, and a memory device. The data path may include transmission lines which may transfer data and/or control signals.

Figure 4:
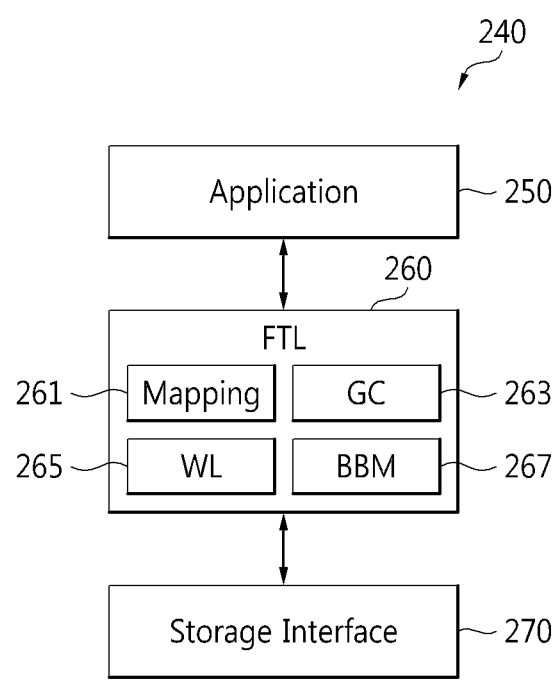
FIG. 4 is a diagram of the hierarchical structure of a host according to some embodiments.

FIG. 4 is a diagram of a hierarchical structure 240 of a host according to some embodiments of the inventive concept. Referring to FIG. 4, the hierarchical structure 240 may include an application layer 250, an FTL 260, and a storage interface layer 270. The FTL 260 may perform address mapping 261, garbage collection (GC) 263, wear-leveling (WL) 265, and bad block management (BBM) 267.

For example, in one embodiment, performing address mapping 261 includes mapping a logical address to a physical address corresponding to a physical position in the data storage device 300. The FTL 260 may translate a logical block address into a physical block address corresponding to a physical position in the data storage device 300 using an address translation mapping table (not shown) which links a logical address to a physical address. An address mapping method may be sector mapping, block mapping, or hybrid mapping but is not restricted to these examples. In addition, the address mapping may map a logical address (e.g., a single logical address) to a plurality of physical addresses, such as two physical addresses of two different nonvolatile memory devices of the data storage or memory device cluster.

Wear leveling (WL) 265 is a technique of managing the data storage device 300 so that a write operation is not concentrated on a particular block in the data storage device 300, for example, each block has a uniform write count. The FTL 260 may record and manage a write count for each block or page and may perform management so that a write operation is performed based on the write count.

Garbage collection (GC) 263 is a technique of equalizing erase counts of the blocks in the data storage device 300. The BBM 267 may refer to a function or code of managing bad block information of the data storage device 300.

The FTL 260 may be software or firmware code which is stored in the memory 225 of the host 200 and executed in the CPU 220. The FTL 260 may be implemented as part of an operating system (OS) of the host 200. As described above, in some embodiments, the FTL 260 may be partially implemented in the host 200 and partially implemented in the data storage device 300. For instance, the address mapping 261, the GC 263, and the WL 265 may be implemented in the host 200 and the BBM 267 may be implemented in the data storage device 300, but the inventive concept is not restricted to this example.

The storage interface layer 270 may correspond to the first interface 230 illustrated in FIG. 2.

Figure 5A:
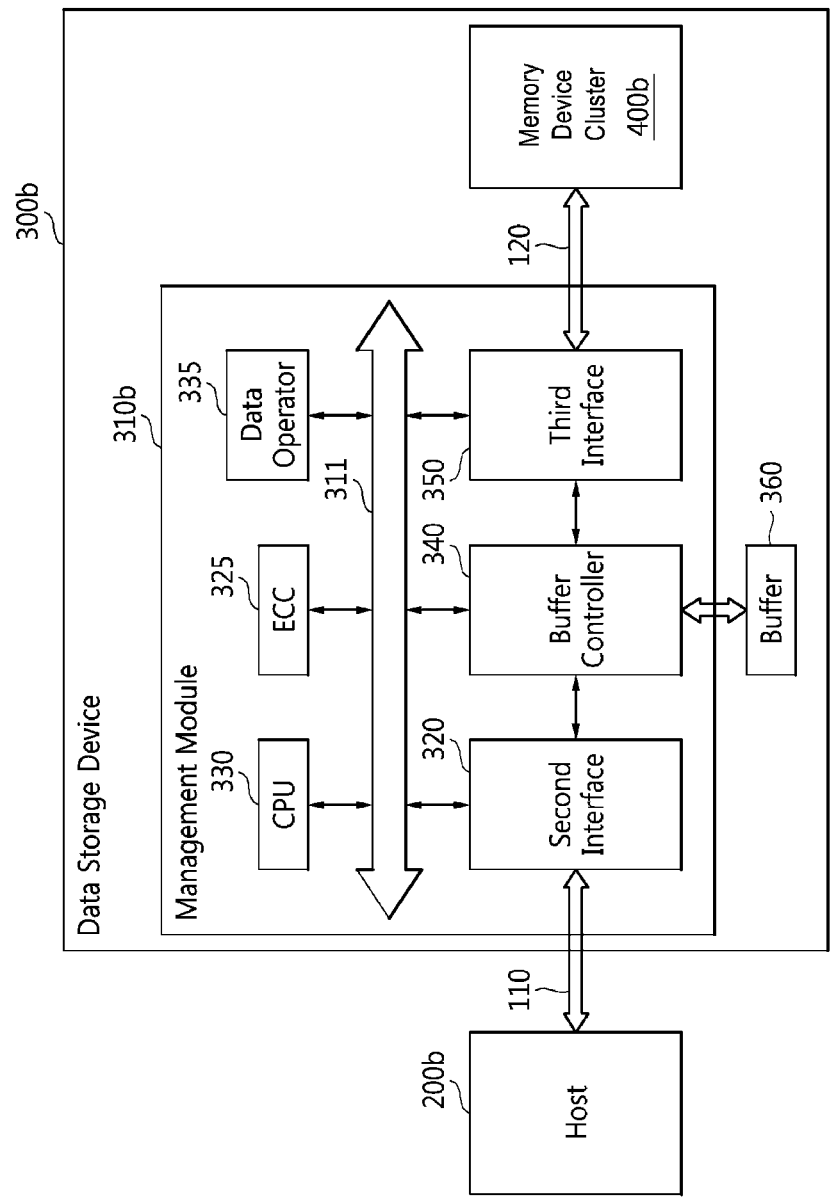
FIGS. 5A and 5B are block diagrams of examples of the data storage device illustrated in FIG. 1.
Figure 5B:
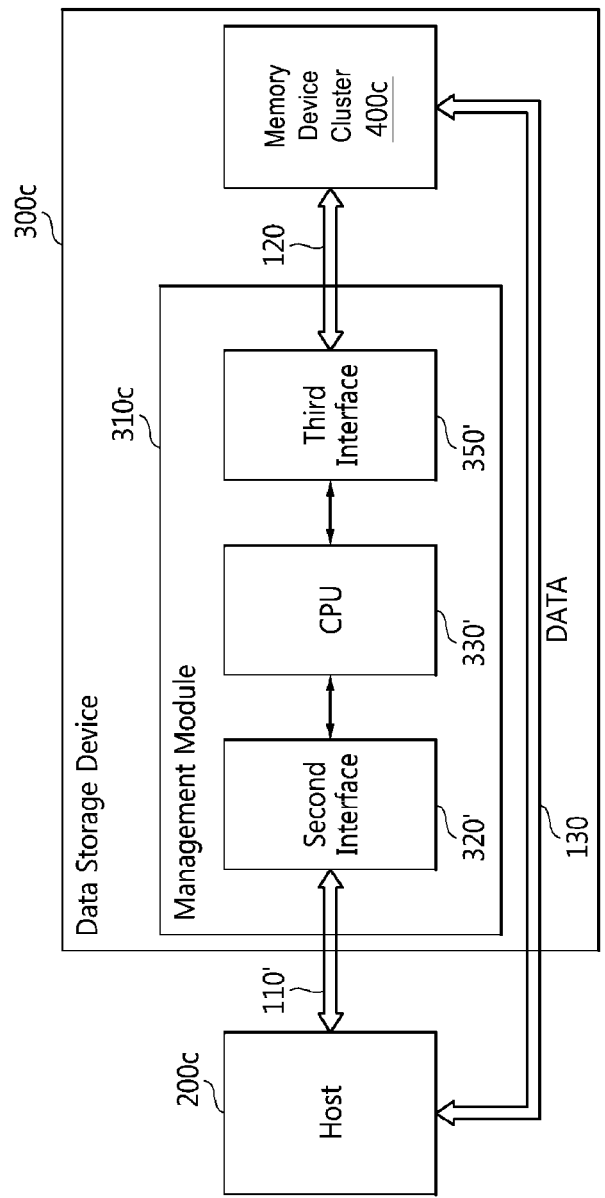

FIGS. 5A and 5B are block diagrams of examples (300b and 300c respectively) of the data storage device 300 illustrated in FIG. 1. The structure and operations of the data storage device 300b illustrated in FIG. 5A are similar to those of the data storage device 300a illustrated in FIG. 2. Therefore, descriptions will be focused on differences between the data storage devices 300a and 300b to avoid redundancy. As compared to the management module 310a of the data storage device 300a illustrated in FIG. 2, a management module 310b of the data storage device 300b illustrated in FIG. 5A may further include an error correction code (ECC) engine 325, also referred to as an ECC circuit, and/or a data operator 335.

The ECC engine 325 may correct errors in data to be stored in a memory device cluster 400b and/or errors in data output from the memory device cluster 400b. The ECC engine 325 may be implemented anywhere within the management module 310b. For instance, the ECC engine 325 may be implemented within the third interface 350.

The data operator 335, or data operation circuit, may compress data to be stored in the memory device cluster 400b and may decompress data output from the memory device cluster 400b. The data operator 335 may also generate parity data from the data to be stored in the memory device cluster 400b. Data operator 335 may also therefore more specifically be referred to as a data compression/decompression circuit.

The structure and operations of the data storage device 300c illustrated in FIG. 5B are similar to those of the data storage device 300a illustrated in FIG. 2. Therefore, descriptions will be focused on differences between the data storage devices 300a and 300c to avoid redundancy. As compared to the management module 310a of the data storage device 300a illustrated in FIG. 2, a management module 310c of the data storage device 300c illustrated in FIG. 5B does not include a buffer controller 340. Accordingly, the data storage device 300c does not include the buffer 360.

An interface 110' between a host 200c and the data storage device 300c may be compatible with a NVM interface (e.g., a NAND interface). Accordingly, the host 200c may send a command (e.g., a NAND command) and an address (or addresses) to the management module 310c according to the interface 110' compatible with the NVM interface and may directly transmit data to a memory device cluster 400c (shown at 130).

The management module 310c may receive the command and the address (or addresses) from the host 200c and apply them to the memory device cluster 400c. The management module 310c may convert the command and the address(es) received from the host 200c to be suitable to the memory device cluster 400c. In this embodiment, the command and the address(es) from the host 200c may be applied to the memory device cluster 400c via the management module 310c, but the data may be directly transmitted (shown at 130) from the host 200c to the memory device cluster 400c without passing through the management module 310c.

Figure 6:
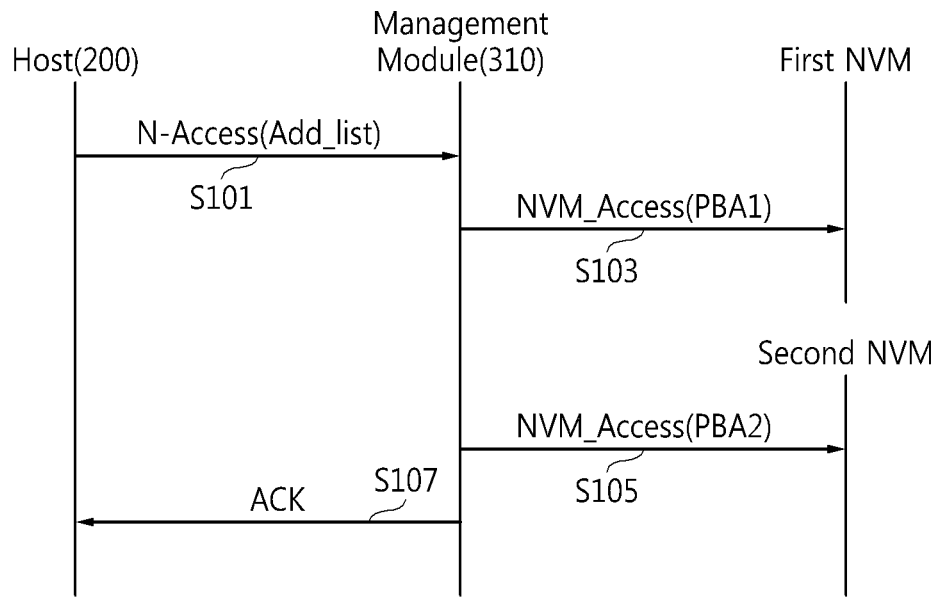
FIG. 6 is a flowchart of a multi-access method of a data processing system according to some embodiments.

FIG. 6 is a flowchart of a multi-access method of the data processing system 100 according to some embodiments of the inventive concept. Referring to one or more of the embodiments discussed above, a host (e.g., 200, 200a, 200b, or 200c) sends a multi-access command (N-Access command) to the data storage device (e.g., 300, 300a, 300b, or 300c) and the data storage device (e.g., a respective management module 310, 310a, 310b, or 310c therein) receives the N-Access command in operation S101.

The N-Access command, referred to as an external multi-access command with respect to the data storage device 300, designates at least two addresses (e.g., at least two physical block addresses) so that an access operation is performed on the at least two physical block addresses with a single command. For example, the at least two physical block addresses can be different blocks on a same chip, different blocks on different chips, or different blocks on different packages. In order to perform an access operation on at least two physical block addresses, at least two separate commands or at least two times of a command are usually necessary. However, according various embodiments of the inventive concept, the N-Access command originally defined between the host 200 and the data storage device 300 is used, so that an access operation (e.g., a write operation, a read operation, or an erase operation) can be performed on at least two different physical block addresses with a single command.

The N-Access command may include an address list Add_list of N addresses (e.g., physical addresses), where N is an integer of at least 2. The N-Access command may or may not include data according to a form or type of a command. The N-Access command will be described in detail with reference to FIGS. 8A and 8B later. The N-Access command may be derived from an initial command generated at the host that includes a single logical address, which may be a destination address. For example, the host may include a flash translation layer that translates a logical address associated with a command initiated at the host (also referred to as a request) into a command that includes two physical addresses. The two physical addresses may be based on the single logical address and the flash translation layer operations, such as described above.

The management module 310 of the data storage device 300 may store the N-Access command in the buffer 360. The management module 310 may convert the N-Access command to an access command NVM_Access suitable to a NVM device (e.g., a NAND flash memory device).

When a first physical address PBA1 and a second physical address PBA2 are included in the address list Add_list of the N-Access command, the management module 310 may generate and send a first access command NVM_Access including the first physical address PBA1 to a first NVM device in operation S103 and may generate and send a second access command NVM_Access including the second physical address PBA2 to a second NVM device in operation S105. Each access command NVM_Access may be a write command NVM_Write, a read command NVM_Read, or an erase command NVM_Erase, but is not restricted thereto. Each access command NVM_Access may be referred to as an internal access command with respect to the data storage device 300.

After sending the first access command NVM_Access to the first NVM device and the second access command NVM_Access to the second NVM device in operation, the management module 310 may send an acknowledgement ACK of the N-Access command to the host 200 in operation S107.

In the manner described above, the data storage device 300 may receive an external multi-access command from a device external to the data storage device (e.g., the host 200), wherein the external multi-access command includes a first address and a second address. Based on the external multi-access command, a first access command is supplied to a first nonvolatile memory, the first access command including the first address, and a second access command is supplied to a second nonvolatile memory, the second access command including the second address. A first access operation is then executed on the first nonvolatile memory device using the first access command and the first address, and a second access operation is executed on the second nonvolatile memory device using the second access command and the second address.

Figure 7:
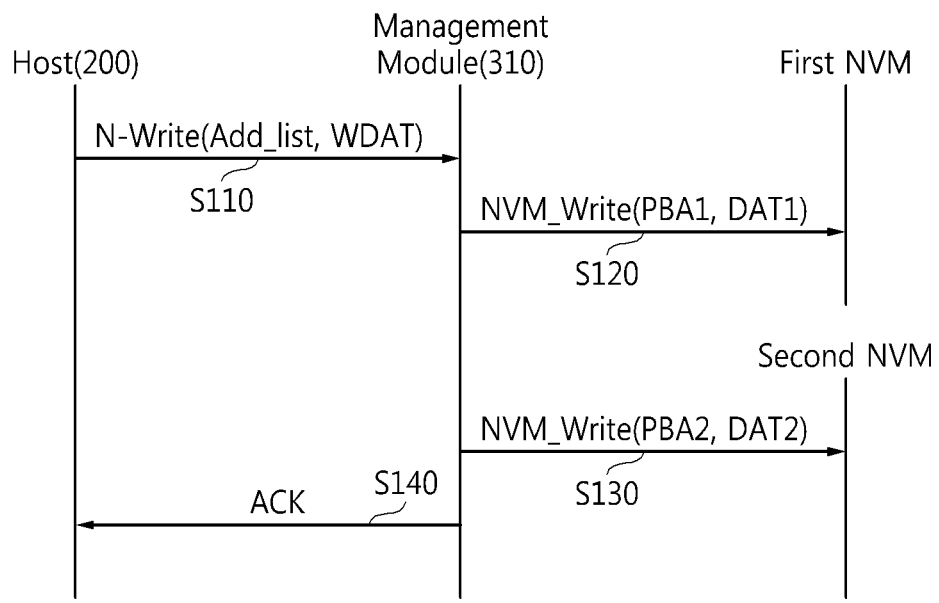
FIG. 7 is a flowchart of a multi-write method of a data processing system according to some embodiments.
Figure 8A:
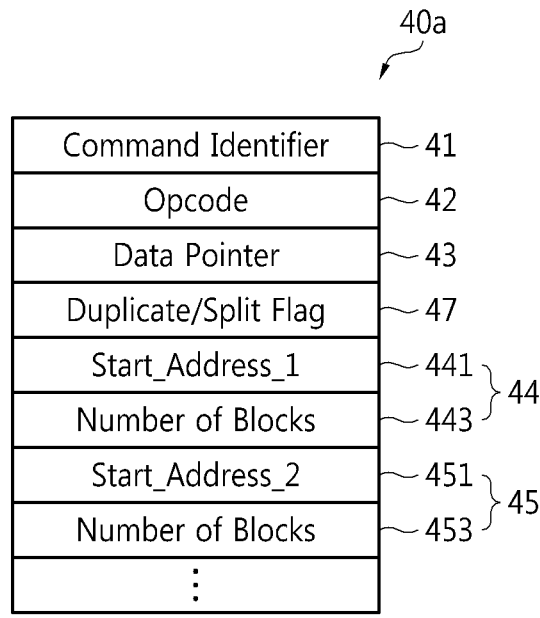
FIG. 8A is a diagram of a multi-write command such as illustrated in FIG. 7 according to some embodiments.
Figure 8B:
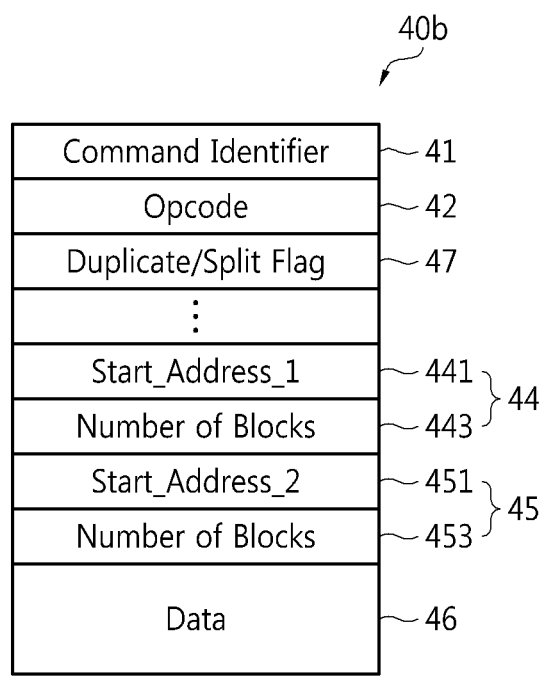
FIG. 8B is a diagram of another multi-write command such as illustrated in FIG. 7 according to other embodiments of the inventive concept.

FIG. 7 is a flowchart of a multi-write method of the data processing system 100 according to some embodiments of the inventive concept. FIG. 8A is a diagram of a multi-access command, such as the N-Write command illustrated in FIG. 7 according to some embodiments of the inventive concept. FIG. 8B is a diagram of a multi-access command, such as the N-Write command illustrated in FIG. 7 according to other embodiments of the inventive concept.

Referring one or more of the embodiments discussed above, the host 200 sends a multi-access command (N-Write) to the data storage device 300, and the management module 310 of the data storage device 300 receives the N-Write command from the host 200 in operation S110. The multi-access command designates at least two addresses (e.g., physical block addresses) so that an operation is performed on the at least two physical block addresses with a single command. In order to perform a data write, read or erase operation on at least two physical block addresses, at least two separate commands or at least two times of a command are usually necessary. However, according to embodiments of the inventive concept, the multi-access command (e.g., N-Write command) originally defined between the host 200 and the data storage device 300 is used, so that an access operation can be performed on at least two different physical block addresses with a single command. For example, the write command transmitted between the host 200 and the data storage device 300 may include at least two different physical addresses associated with two different respective memory blocks.

For instance, the host 200 may enable the data storage device 300 to perform an access operation on N different physical block addresses with a single command (e.g., N-Write command). Referring to FIG. 8A, a command 40a may include a command identifier 41, an opcode 42, a data pointer 43, a duplicate/split flag 47, and an address list. The command 40a may also include an optional compression flag (not shown), and/or a chip address (e.g., chip enable, also not shown).

The command identifier 41 may be data uniquely defined to identify a command. For example, each command may be identified with a number so that it can be later matched with corresponding data. For example, a write or erase command from a host may include a command identifier, so that when an acknowledgment is returned to the host, it has the same identifier so that the host knows which command/request the acknowledgment is responsive to. Alternatively, a read command from a host may include a command identifier, so that when data is returned to the host, it has the same identifier so that the host knows which command/request the acknowledgment is responsive to.

The opcode 42 may specify an operation corresponding to a command. For example, the operation may be a normal (e.g., single) read operation, a multi-read operation, a normal (e.g., single) write operation, a multi-write operation, etc. The opcode 42 may designate the type of command, so that the management module 310 knows how to process the command. For example, if the opcode is for a normal read (e.g., using a single address), then the management module 310 can appropriately convert the command, address, and any data for a single access. However, if the opcode is for a multi-read, then the management module 310 can convert the command, addresses, and any data for a multi-access. The opcode may also be described herein as a command-type indicator.

The data pointer 43 may be address information indicating the position of data in the memory 225 of the host 200. Data pointers may be connected in a linked list structure, but the inventive concept is not restricted to this embodiment. The management module 310 of the data storage device 300 may read data from or write data to the memory 225 of the host 200 based on the data pointer 43.

The duplicate/split flag 47 may be included to indicate, in the case of multi-access, whether the associated data is duplicate data or split data, or to indicate neither (e.g., if the command is a single-access command). As discussed further below, in some cases, data associated with a write command is to be duplicated and stored at two different physical locations. Alternatively, data associated with a write command may be split so that a portion of it is stored at the first physical location, and the remainder is stored at the second physical location. Though two locations are described, this is an example only, and more locations (e.g., three or more) may be used to duplicate or split data into three or more locations. Similarly for read commands, data can be read that is duplicate data stored in multiple locations, or that alternatively is split data stored in multiple locations. Based on the value of the duplicate/split flag 47, the management module 310 controls how to process the incoming or outgoing command and/or data.

The address list may include at least two, (e.g., N) physical addresses. For instance, the address list may include a first physical address 44 and a second physical address 45. Each of the physical addresses 44 and 45 may include a start address (Start_Address) 441 or 451 of physical blocks to which data will be written in the data storage device 300 and the number of physical blocks 443 or 453. Alternatively, each physical address 44 or 45 may include the Start_Address 441 or 451 and an end address (not shown) of the physical blocks to which data will be written in the data storage device 300. Consequently, each physical address included in the address list may include, in various forms, information for designating a position of physical blocks to which data will be written.

Though not shown, an additional field in the command may indicate a chip address (e.g., in the form of chip enable data). Thus, if two physical addresses associated with an external multi-access command correspond to a first physical address at a first chip and a second physical address at a second chip, the two chip addresses can be included in the command 40a. In one embodiment, such chip addresses are included in the same field as the Start Addresses, for example, as additional bits added to the start address. The chip addresses need not be different, however, and may be the same chip address in the case where different physical addresses in the external multi-access command are for different blocks in the same chip. In some embodiments, the different physical addresses correspond to the same relative physical address within two different chips, but two different chip addresses.

Also not shown, an additional field in the command may include a compression/decompression code. For example, based on whether and how data should be compressed or decompressed in response to a multi-access command, a data compression/decompression code can be used.

Referring to FIG. 8B, an N-Write command 40b may include the command identifier 41, the opcode 42, a duplicate/split flag 47, the address list, and data 46. Though not shown, it may also include a chip address/chip addresses, and/or a compression/decompression flag. The N-Write command 40b illustrated in FIG. 8B is similar to the N-Write command 40a illustrated in FIG. 8A; thus differences therebetween will be described to avoid redundancy.

While the N-Write command 40a illustrated in FIG. 8A includes the data pointer 43, the N-Write command 40b illustrated in FIG. 8B includes the data 46 to be written to the data storage device 300. The N-Write command 40a or 40b may have a packet form, but the inventive concept is not restricted to these embodiments.

Referring back to FIG. 7, the management module 310 of the data storage device 300 may receive the N-Write command and may also receive and store write data WDAT included in the N-Write command in the buffer 360. The N-Write command may be a single command including a single command identifier. Alternatively, the management module 310 may read the write data WDAT from the memory 225 of the host 200, which is designated by the data pointer 43 included in the N-Write command illustrated in FIG. 8A, and may store the write data WDAT in the buffer 360.

The management module 310 converts the N-Write command (an external command) into the write command NVM_Write (e.g., an internal command) suitable to a NVM device (e.g., a NAND flash memory device). When the first and second physical addresses PBA1 and PBA2 are included in the address list Add_list of the N-Write command, the management module 310 may generate and send a first write command NVM_Write including the first physical address PBA1 to the first NVM device in operation S120 and may generate and send a second write command NVM_Write including the second physical address PBA2 to the second NVM device in operation S130. The first and second NVM devices may be the NVM devices, e.g., 410-1 and 410-2, respectively, connected to different channels, e.g., CHA and CHB, respectively, as shown in FIG. 2. Accordingly, operations S120 and S130 may be performed in parallel (e.g., at the same time).

First data DAT1 written to the first NVM device and second data DAT2 written to the second NVM device are based on the write data WDAT received from the host 200. For example, the first data DAT1 and second data DAT2 may be the data stored in the buffer 360, and may be supplied to the respective first and second nonvolatile memory devices from the buffer 360. Each of the first and second data DAT1 and DAT2 may be the same as the write data WDAT, may be part of the write data WDAT, may be compressed data of the write data WDAT, or may be parity data of the write data WDAT, but the inventive concept is not restricted to these examples. The compressed data or the parity data of the write data WDAT may be generated by the data operator 335 illustrated in FIG. 5A.

More specifically, in some embodiments, the external multi-access command is a multi-write command that includes write data, and a first part of the write data is included in a first internal access command (e.g., in a first command that is converted by the management module 310 and that uses the first address), and a second part of the write data and not the first part of the write data is included in the second internal access command (e.g., in a second command that is converted by the management module 310 and that uses the second address). In this case, the duplicate/split flag 47 may indicate split data.

In some embodiments the external multi-access command is a multi-write command that includes write data, and all of the write data associated with the multi-write command is included in the first internal access command, and all of the write data associated with the multi-write command is also included in the second internal access command. In this case, the duplicate/split flag 47 may indicate duplicate data.

According to the above description, a multi-access request may be initiated and generated at the host 200 and may be first processed at the host 200 (e.g., at a flash translation layer of the host), to form a multi-access command. For example, a mapping operation may be performed (e.g., using a mapping table and circuit), which converts a first address, such as a logical address, into two or more second addresses, e.g., physical addresses. The two or more second addresses may be different from each other, and may be selected using flash translation layer controls such as described in connection with FIG. 4, for example. The multi-access command may then be converted at the data storage device, e.g., by a management module 310, into separate first and second internal access commands. In this manner, the host 200 may supply a multi-access command to the data storage device 300, and the data storage device 300, via the management module 310, may supply respective internal multi-access commands based on the command received from the host 200 to a plurality of respective memory devices of the data storage device 300, for example to different physical addresses of a plurality of memory devices.

Figure 9:
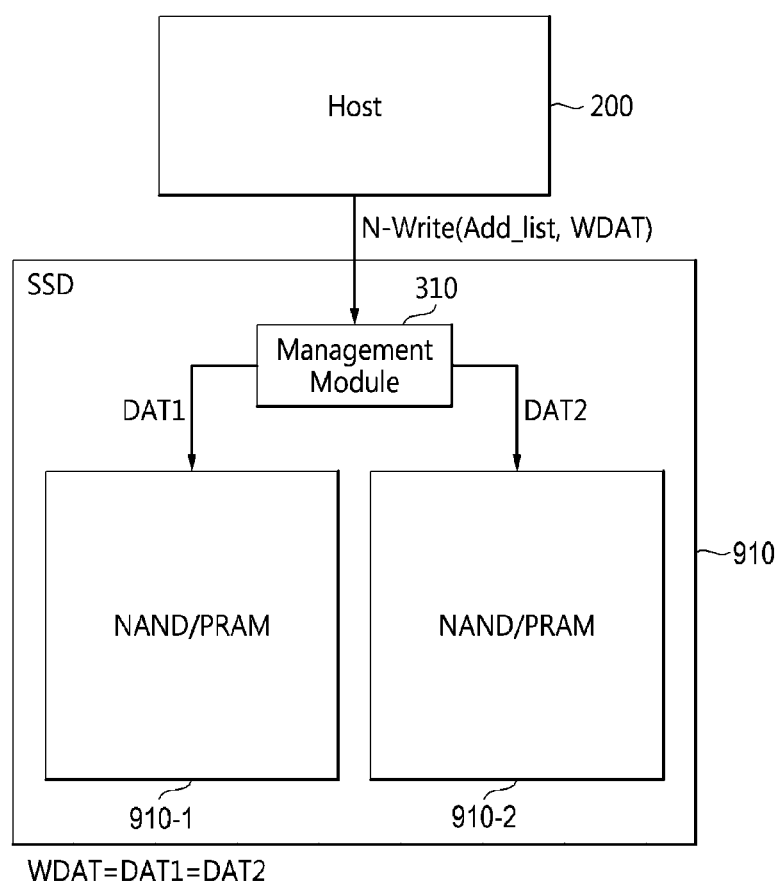
FIG. 9 is a diagram for explaining a multi-write operation of a data processing system according to some embodiments.

FIG. 9 is a diagram for explaining a multi-write operation of a data processing system according to some embodiments of the inventive concept. Here, each of the first and second data DAT1 and DAT2 may be the same as the write data WDAT received from the host 200.

The management module 310 may store data the same as the write data WDAT received from the host 200 at different physical addresses, i.e., a first physical address and a second physical address according to the opcode 42 and a duplicate/split flag 47 (see FIGS. 8A and 8B) in a multi-write command (N-Write command). In some embodiments, the opcode 42 and duplicate/split flag 47 may be part of the same field. As shown in FIG. 9, the first physical address may be on a first NVM device (e.g., NAND/PRAM 910-1), and the second physical address may be on a second NVM device (e.g., NAND/PRAM 910-2). As the same write data WDAT is stored at different physical addresses of a data storage device (e.g., SSD) 910, duplication or mirroring of the write data WDAT may be carried out.

Alternatively, one of the first and second data DAT1 and DAT2 is the same as the write data WDAT and the other may be the compressed data or the parity data of the write data WDAT. For example, a compression/decompression flag, and/or even a further parity/error correction flag may indicate as such. At this time, the management module 310 may store the write data WDAT received from the host 200 at the first physical address in operation S120 (FIG. 7) and may store the compressed data or the parity data of the write data WDAT at the second physical address in operation S130. It should be noted that when error correction or compression is performed by the management module, it may be performed before the data is duplicated/split, or after the data is duplicated/split. Typically, error correction (e.g., using error correction code, "ECC") is performed on units much smaller than the page/block size for SSD—for example, units of 1 k. So ECC can be performed in this case in a plurality of steps either before or after duplication or splitting of the data.

Figure 10:
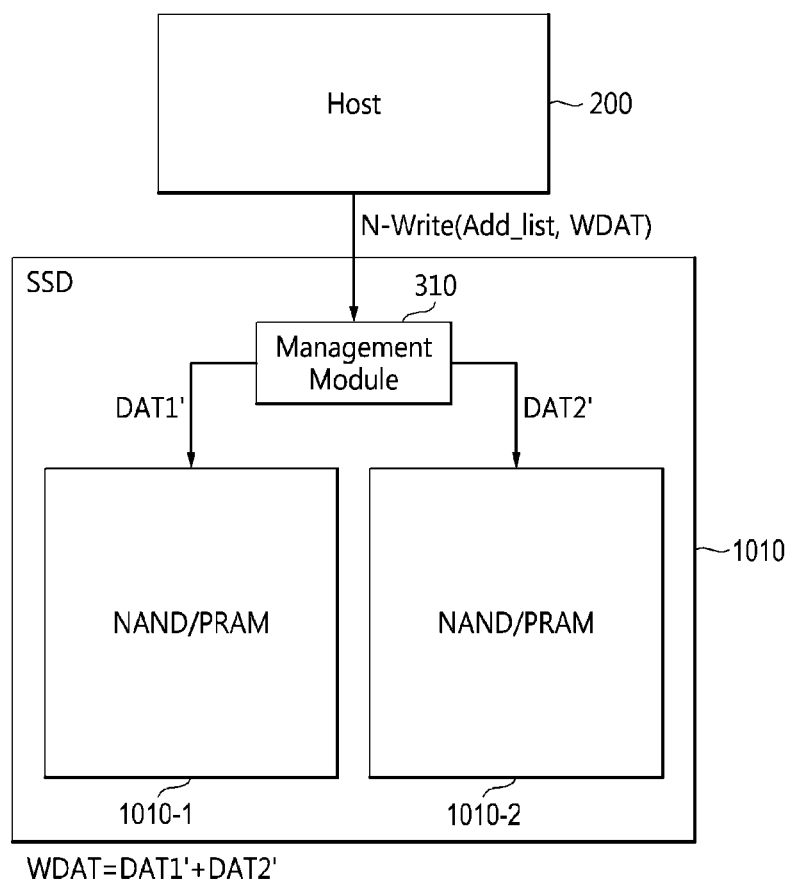
FIG. 10 is a diagram for explaining a multi-write operation of a data processing system according to other embodiments.

FIG. 10 is a diagram for explaining a multi-write operation of a data processing system according to other embodiments of the inventive concept. The management module 310 may divide the write data WDAT received from the host 200 into at least two segments DAT1' and DAT2' according to the opcode 42 and duplicate/split flag 47 in a multi-write command (N-Write command) and may store the segments DAT1' and DAT2' at different physical addresses, i.e., a first physical address and a second physical addresses, respectively (in operations S120 and S130). As shown in FIG. 10, the first physical address may be on a first NVM device (e.g., NAND/PRAM 1010-1), and the second physical address may be on a second NVM device (e.g., NAND/PRAM 1010-2) of a data storage device (e.g., SSD 1010). For example, a duplicate/split flag 47 may indicate that a first part of data associated with the multi-access command should be written to a first memory device of the data storage device and not a second memory device of the data storage device, and a second part of the data associated with the multi-access command should be written to the second memory device and not the first memory device. The first segment DAT1' may be the first half of the write data WDAT and the second segment DAT2' may be the second half of the write data WDAT.

After sending the first write command NVM_Write command to the first NVM device 1010-1 in operation S120 (FIG. 7) and sending the second write command NVM_Write command to the second NVM device 1010-2 in operation S130, the management module 310 may send the acknowledgement ACK of the N-Write command to the host 200 in operation S140.

Figure 11:
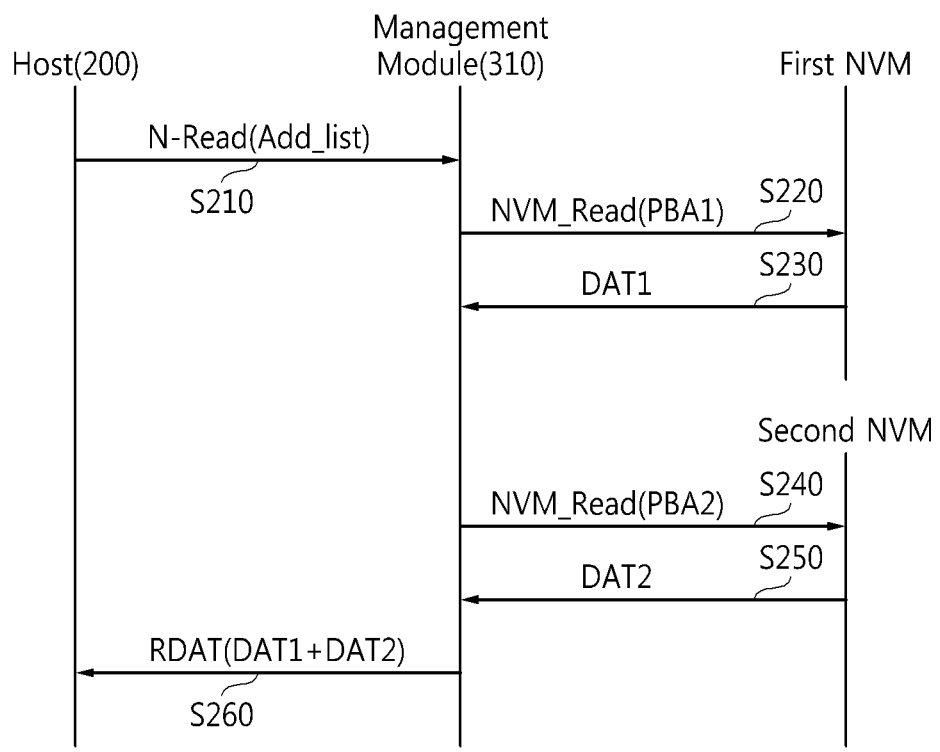
FIG. 11 is a flowchart of a multi-read method of a data processing system according to some embodiments.

FIG. 11 is a flowchart of a multi-read method of a data processing system according to some embodiments of the inventive concept. Referring to one or more of the embodiments discussed above, the host 200 sends a multi-read command (N-Read) to the data storage device 300 in operation S210 and the management module 310 of the data storage device 300 receives the N-Read command from the host 200 in operation S210. The host may initially generate a multi-read request and convert the multi-read request into a multi-read command including two addresses, for example, using a mapping table and circuit such as described above.

The N-Read command designates at least two (e.g., N) physical block addresses so that a read operation is performed on the at least two physical block addresses with a single command. According to embodiments of the inventive concept, the N-Read command originally defined between the host 200 and the data storage device 300 is used, so that a read operation can be performed on at least two different physical block addresses with a single command, e.g., having a single command identifier.

The N-Read command may be similar to the N-Write command illustrated in FIG. 8A or 8B. Like the N-Write command 40*a* or 40*b* illustrated in FIG. 8A or 8B, the N-Read command may include the command identifier 41, the opcode 42, the duplicate/split flag 47, the compress/decompress flag, and the address list 44 and 45 (and an optional chip address field). However, the N-Read command may be different than the N-Write command in that the N-Read command does not include the data pointer 43 or the data 46 to be written to the data storage device 300.

The management module 310 of the data storage device 300 may receive and store the N-Read command in the buffer 360. The management module 310 may convert the N-Read command to a read command NVM_Read suitable to an NVM device (e.g., a NAND flash memory device).

When the first and second physical addresses PBA1 and PBA2 are included in the address list Add_list of the N-Read command, the management module 310 may generate and send a first read command NVM_Read including the first physical address PBA1 to the first NVM device in operation S220 and may generate and send a second read command NVM_Read including the second physical address PBA2 to the second NVM device in operation S240. The first and second NVM devices may be the NVM devices, e.g., 410-1 and 410-2, respectively, connected to different channels, e.g., CHA and CHB, respectively, as shown in FIG. 2. Accordingly, operations S220 and S240 may be performed in parallel (e.g., at the same time).

The first NVM device may read the first data DAT1 from the first physical address PBA1 in response to the first read command NVM_Read and send the first data DAT1 to the management module 310 in operation S230. The second NVM device may read the second data DAT2 from the second physical address PBA2 in response to the second read command NVM_Read and send the second data DAT2 to the management module 310 in operation S250. Operations S230 and S250 may be performed in parallel.

The management module 310 may temporarily store the first and second data DAT1 and DAT2 respectively read from the first and second NVM devices in the buffer 360. The management module 310 may transmit read data RDAT to the host 200 based on the first and second data DAT1 and DAT2 in operation S260.

The read data RDAT transmitted to the host 200 may be a combination of the first and second data DAT1 and DAT2. For instance, when the write data WDAT received from the host 200 has been divided into the first and second data DAT1 and DAT2 and separately stored at the first and second physical addresses PBA1 and PBA2 according to an N-Write command and a duplicate/split flag indicating splitting of data, the host 200 may set the opcode 42 in the N-Read command to a particular value before sending the N-Read command to the data storage device 300. The data storage device 300 may read the first and second data DAT1 and DAT2 from the first and second physical addresses PBA1 and PBA2, respectively, and send the read data RDAT obtained by combining the first and second data DAT1 and DAT2 to the host 200 according to the N-Read command in operation S260.

Figure 12:
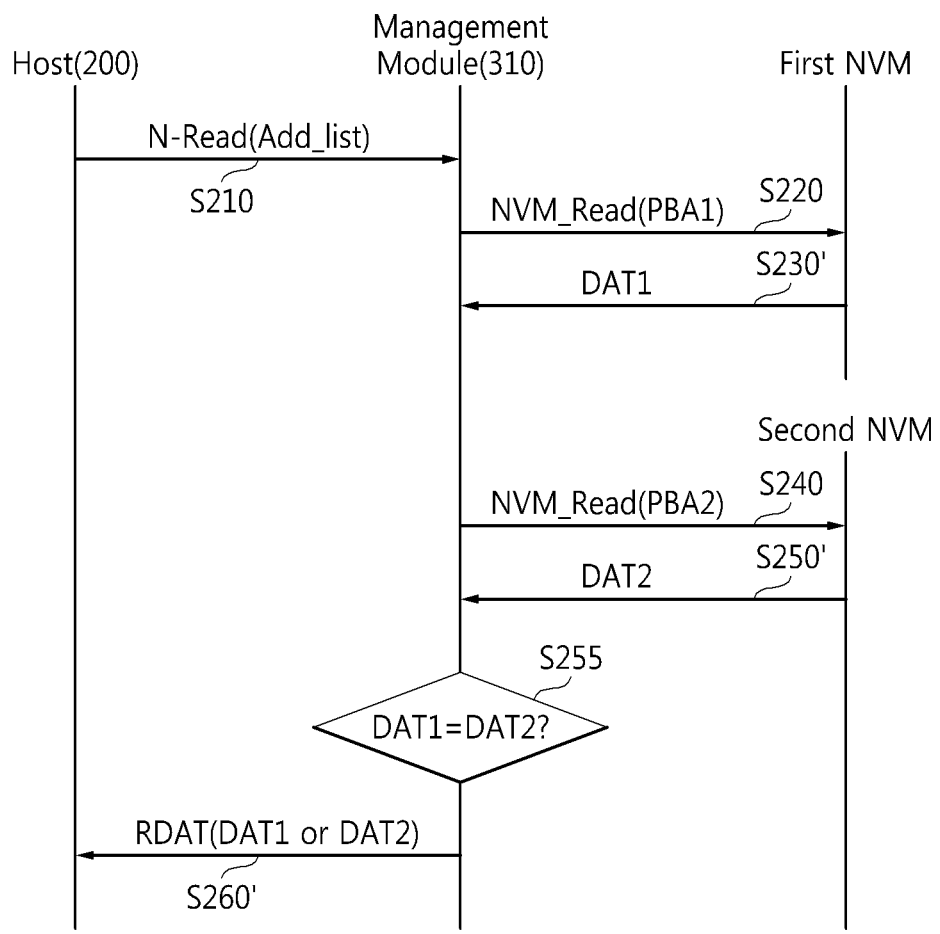
FIG. 12 is a flowchart of a multi-read method of a data processing system according to other embodiments.

FIG. 12 is a flowchart of a multi-read method of a data processing system according to other embodiments of the inventive concept. The multi-read method illustrated in FIG. 12 is similar to that illustrated in FIG. 11; thus differences therebetween will be mainly described.

In the embodiments illustrated in FIG. 12, the read data RDAT transmitted to the host 200 may be either the first data DAT1 or the second data DAT2. In this situation, when the same data are stored at different physical addresses for data duplication or mirroring (e.g., duplicate/split flag indicates duplication), only one of the data read from the different physical addresses is transmitted to the host 200. At this time, the management module 310 may transmit the data that has been read earliest among the data DAT1 and DAT2 from the different physical addresses to the host 200, for example, the data with the faster read speed. In this manner, the management circuit is configured to select between sending the first data read from the first nonvolatile memory device to the host and sending the second data read from the second nonvolatile memory device to the host based on the data read speed of the first nonvolatile memory device and the data read speed of the second nonvolatile memory device.

In one embodiment, for example, without using a duplicate/split flag, the management module 310 may compare the first and second data DAT1 and DAT2 read from the different physical addresses in operation S255. When the first and second data DAT1 and DAT2 are the same as each other, only one of the first and second data DAT1 and DAT2 may be transmitted to the host 200 in operation S260'. When the first and second data DAT1 and DAT2 are different from each other, both data may be transmitted to the host 200 as recombined, previously split, data.

The management module 310 may correct errors in data to be stored in the memory device cluster 400 and/or errors in data output from the memory device cluster 400 using the ECC engine 325 shown in FIG. 5A.

The management module 310 may perform a predetermined data process on the first data DAT1 or the second data DAT2. For instance, when the second data DAT2 is the compressed data of the first data DAT1, the management module 310 may decompress the second data DAT2 to obtained decompressed data. When the second data DAT2 is the parity data of the first data DAT1, the management module 310 may compare the parity data of the first data DAT1 with the second data DAT2 that has been read and may transmit the first data DAT1 as the read data RDAT to the host 200 when the parity data of the first data DAT1 is the same as the second data DAT2.

Figure 13:
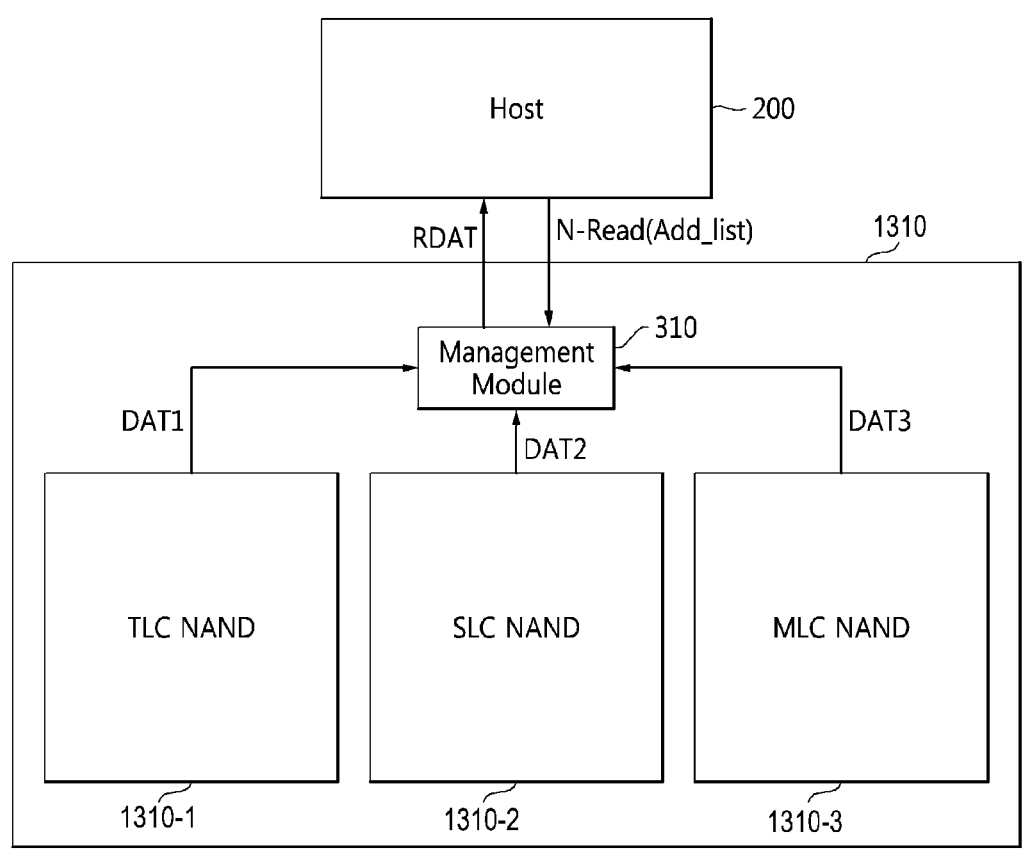
FIG. 13 is a diagram for explaining a multi-read operation of a data processing system according to some embodiments.

FIG. 13 is a diagram for explaining a multi-read operation of a data processing system according to some embodiments of the inventive concept. In the embodiments illustrated in FIG. 13, an N-Read command may include the address list Add_list including three different physical addresses.

The management module 310 of the data storage device 1310 may read first through third data DAT1, DAT2, and DAT3 from NVM devices 1310-1, 1310-2, and 1310-3, respectively, having the three different physical addresses, respectively, in response to the N-Read command. The three NVM devices may be different types of devices. For example, the NVM device 1310-1 may be three-level cell (TLC) NAND; the NVM device 1310-2 may be single-level cell (SLC) NAND; the NVM device 1310-3 may be multi-level cell (MLC) NAND.

The management module 310 may transmit a combination of the first through third data DAT1, DAT2, and DAT3 to the host 200. Alternatively, the management module 310 may transmit one of the first through third data DAT1, DAT2, and DAT3 to the host 200.

In the embodiments illustrated in FIG. 7 and FIGS. 9 through 13, data is transferred between the host 200 and an NVM device via the management module 310. However, the data may be directly transferred between the host 200 and the NVM device without passing through the management module 310 in other embodiments.

Figure 14:
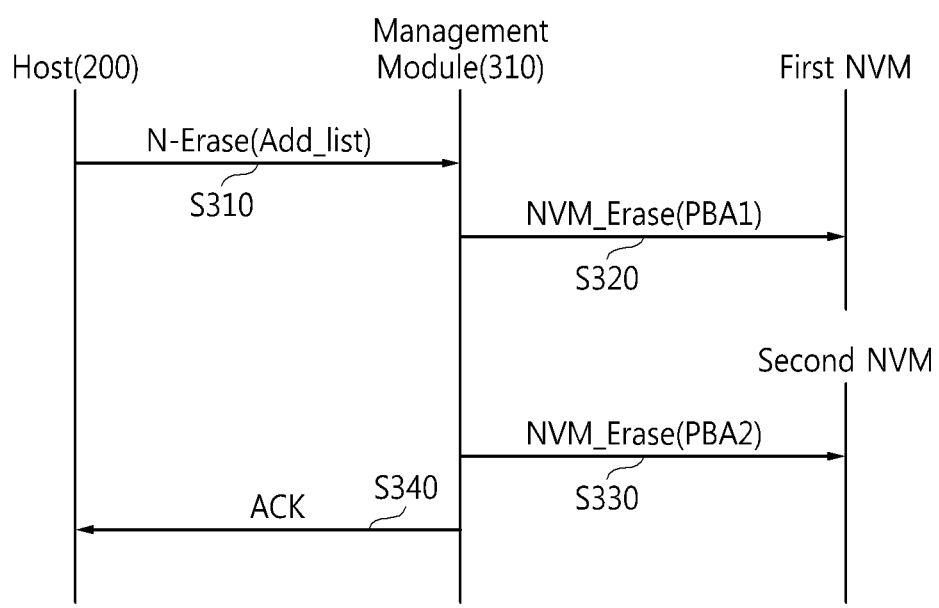
FIG. 14 is a diagram for explaining a multi-erase method of a data processing system according to some embodiments.

FIG. 14 is a diagram for explaining a multi-erase method of a data processing system according to some embodiments of the inventive concept. Referring to one or more of the embodiments discussed above, the host 200 sends a multi-erase command (N-Erase) to the data storage device 300 in operation S310 and the management module 310 of the data storage device 300 receives the N-Erase command from the host 200 in operation S310. The N-Erase command designates at least two physical block addresses so that an erase operation is performed on the at least two physical block addresses with a single command. Similar conversion and flags as described above may be used for the N-Erase command. According to embodiments of the inventive concept, the N-Erase command originally defined between the host 200 and the data storage device 300 is used, so that an erase operation can be performed on at least two different physical block addresses with a single command.

The N-Erase command may be similar to the N-Write command illustrated in FIG. 8A or 8B. Like the N-Write command 40a or 40b illustrated in FIG. 8A or 8B, the N-Erase command may include the command identifier 41, the opcode 42, and the address list 44 and 45. However, the N-Erase command may not include the data pointer 43 like an N-Write command or the data 46 to be written to the data storage device 300, and also may not include a duplicate/split flag 47 or a compression/decompression flag.

The management module 310 of the data storage device 300 may receive and store the N-Erase command in the buffer 360. The management module 310 may convert the N-Erase command to an erase command NVM_Erase suitable to an NVM device (e.g., a NAND flash memory device).

When the first and second physical addresses PBA1 and PBA2 are included in the address list Add_list of the N-Erase command, the management module 310 may generate and send a first erase command NVM_Erase including the first physical address PBA1 to the first NVM device in operation S320 and may generate and send a second erase command NVM_Erase including the second physical address PBA2 to the second NVM device in operation S330. The first and second NVM devices may be the NVM devices, e.g., 410-1 and 410-2, respectively, connected to different channels, e.g., CHA and CHB, respectively, as shown in FIG. 2. Accordingly, operations S320 and S330 may be performed in parallel (e.g., at the same time).

The first NVM device may erase blocks corresponding to the first physical address PBA1 in response to the first erase command NVM_Erase. The second NVM device may erase blocks corresponding to the second physical address PBA2 in response to the second erase command NVM_Erase.

After sending the first erase command NVM_Erase to the first NVM device in operation S320 and sending the second erase command NVM_Erase to the second NVM device in operation S330, the management module 310 may send the acknowledgement ACK of the N-Erase command to the host 200 in operation S340.

According to the above embodiments, a data storage device can receive an external multi-access command from a device external to the data storage device. The external multi-access command can include a first address and a second address. A first access command (e.g., generated by the data storage device) can be supplied based on the external multi-access command to a first nonvolatile memory of the data storage device. For example, the first access command may include the first address. Then a first access operation is executed on the first nonvolatile memory device using the first access command and the first address. A second access command (e.g., generated by the data storage device) can be supplied based on the external multi-access command to a second nonvolatile memory. For example, the second access command may include the second address. A second access operation is executed on the second nonvolatile memory device using the second access command and the second address. The multi-access command may include a single command identifier. Further, the first access operation and second access operation can be executed at the same time.

As described above, data can be written to, read from, or erased from at least two storage regions with a single multi-access command transmitted from the host 200 to the data storage device 300. Accordingly, as compared to conventional data processing systems typically requiring at least two times of transmission of a command, a data processing system according to some embodiments of the invention enables efficient use of a bandwidth, thereby reducing power consumption.

Figure 15:
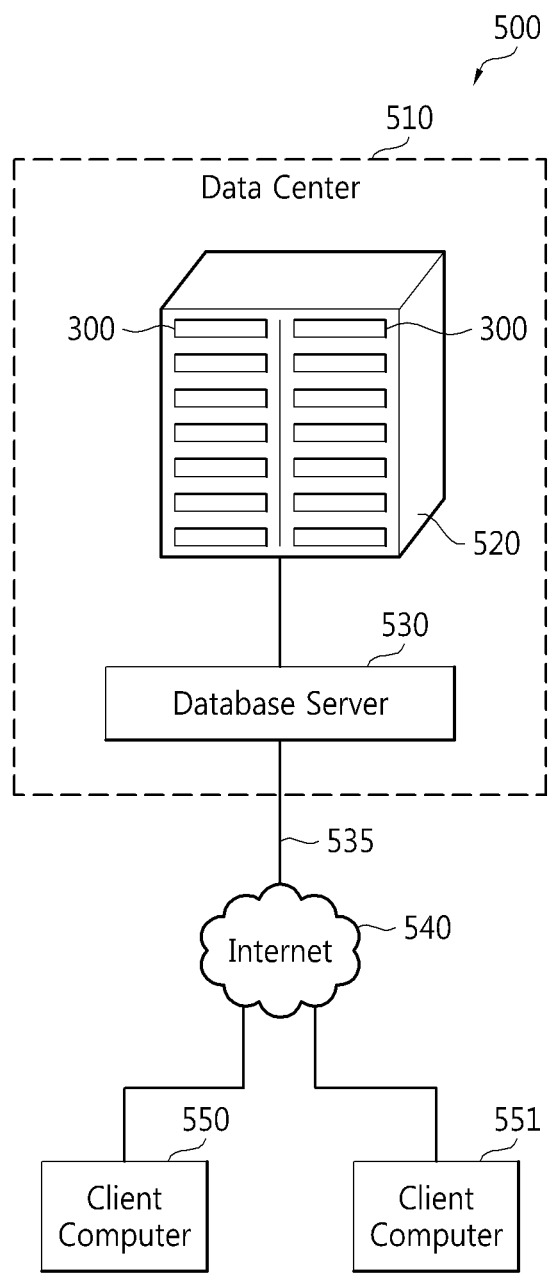
FIG. 15 is a block diagram of a data processing system according to some embodiments.

FIG. 15 is a block diagram of a data processing system 500 according to certain embodiments of the inventive concept. The data processing system 500 may include a database 520, a database server 530, a second network 540, and a plurality of client computers 550 and 551. The database 520 and the database server 530 may be included in a data center 510. The data center 510 may be an internet data center or a cloud data center.

The database 520 may include a plurality of data storage devices 300. The data storage devices 300 may be installed in racks. The structure and operations of the data storage devices 300 are substantially the same as or similar to those of the data storage devices described above.

The database server 530 may control the operations of each of the data storage devices 300. The database server 530 may perform the function of the host 200 illustrated in FIG. 1. The database server 530 may be connected to the second network 540, e.g. an internet or Wi-Fi, via a first network 535, e.g. a local area network (LAN). The client computers 550 and 551 may be connected to the database server 530 via the second network 540.

Figure 16:
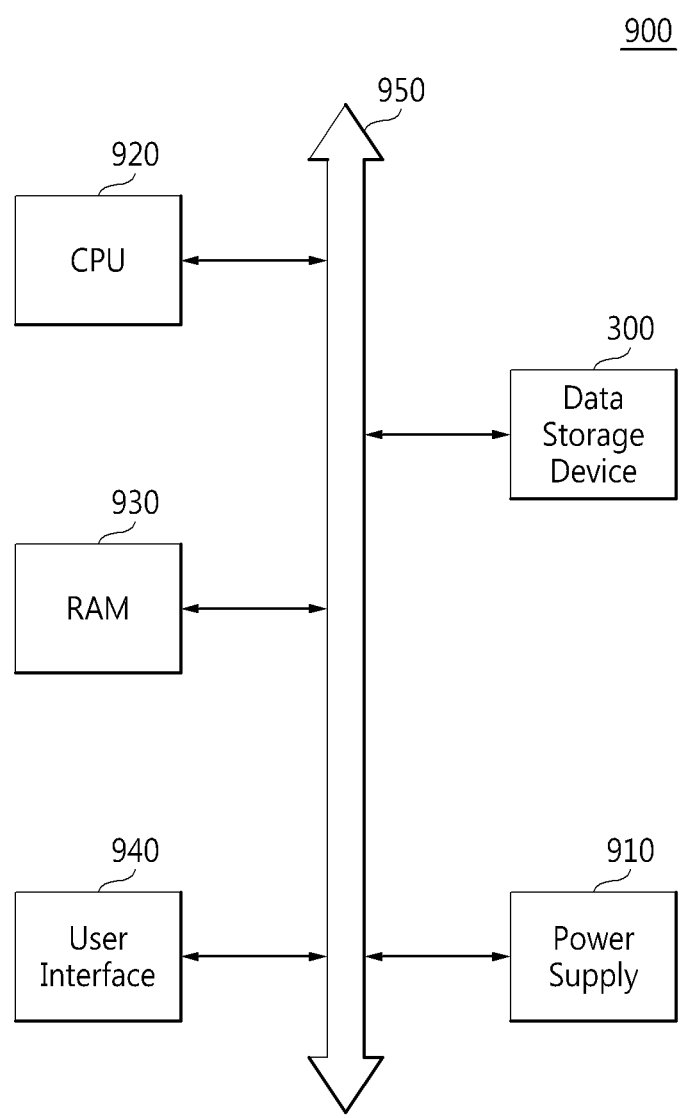
FIGS. 16 and 17 are block diagrams of a data processing system including a data storage device according to some embodiments.
Figure 17:
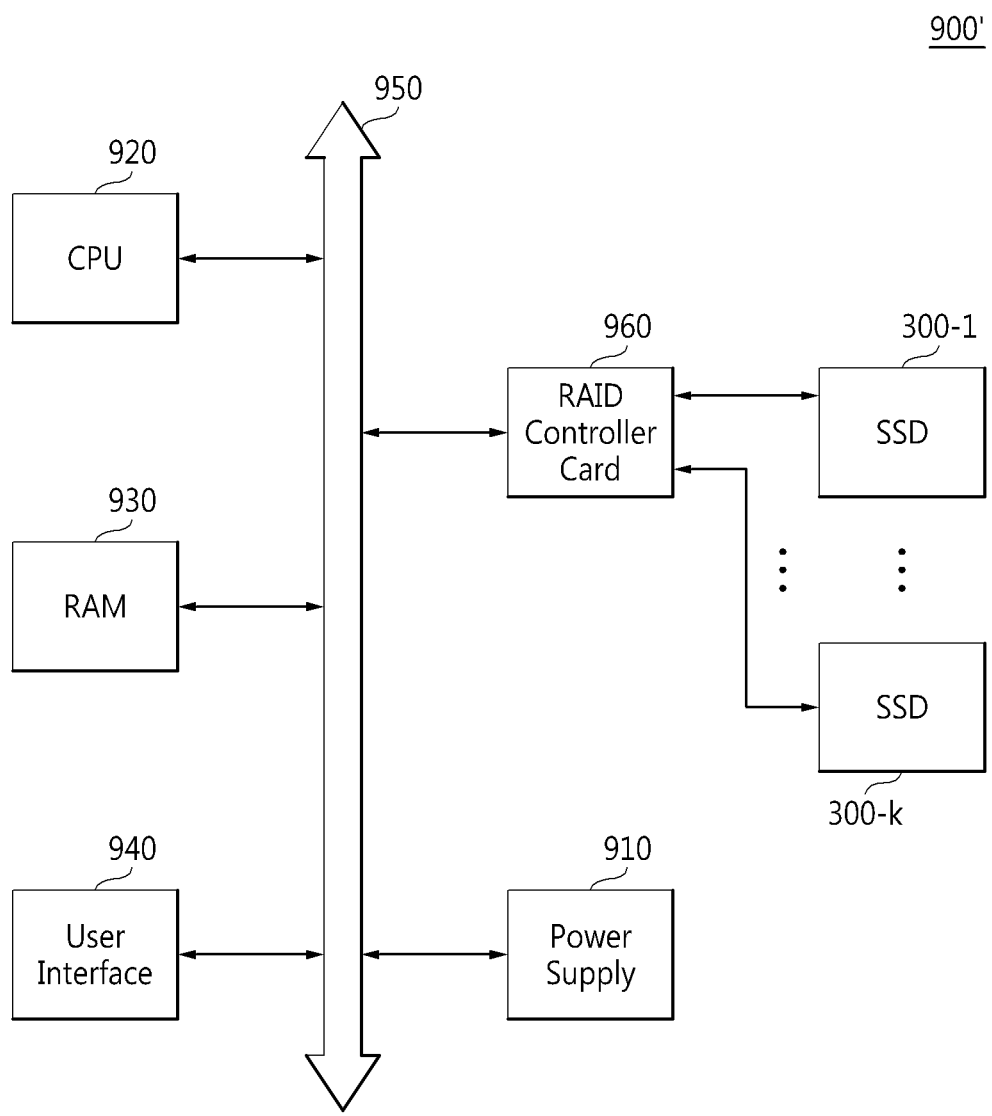

FIGS. 16 and 17 are block diagrams of data processing systems 900 and 900' including the data storage device 300 according to some embodiments of the inventive concept. Referring to FIG. 16, the data processing system 900 may include the data storage device 300, a power supply 910, a CPU 920, a RAM 930, a user interface 940, and a system bus 950 which electrically connects the elements 300, 910, 920, 930, and 940 with one another.

The CPU 920 controls the overall operation of the data processing system 900. The RAM 930 stores information necessary for the operation of the data processing system 900. The user interface 940 provides an interface between the data processing system 900 and a user. The power supply 910 supplies power to the internal elements, i.e., the CPU 920, the RAM 930, the user interface 940, and the data storage device 300.

The CPU 920 may correspond to the host 200; the data storage device 300 may perform an access operation on different physical addresses in response to a multi-access command (N-Access) from the host 200.

The structure of the data processing system 900' illustrated in FIG. 17 is similar to that of the data processing system 900 illustrated in FIG. 16; thus differences therebetween will be mainly described to avoid redundancy. As compared to the data processing system 900 illustrated in FIG. 16, the data processing system 900' illustrated in FIG. 17 further includes a redundant array of independent disks (RAID) controller card 960. A plurality of data storage devices (e.g., SSDs 300-1 through 300-$k$ (where "k" is an integer of at least 2)) may not directly interface with a host, i.e., the CPU 920, but they may be mounted on the RAID controller card 960 and may interface with the CPU 920 via the RAID controller card 960.

The data processing systems 900 and 900' respectively illustrated in FIGS. 16 and 17 each may be a computer, a PDA, a cellular phone, a smart phone, an MP3 player, a portable multimedia player (PMP), an automotive navigation system, or a mobile interne device (MID) but is not restricted to these examples.

As described above, according to some embodiments of the inventive concept, a multi-access command originally defined between a host and a data storage device is used to transmit a plurality of addresses and data with a single command, so that data processing efficiency of the data storage device is increased and data transmission efficiency between the host and the data storage device is also increased. As a result, power consumption of the data storage device and a data processing system including the data storage device is reduced.

While the inventive concept has been particularly shown and described with reference to exemplary embodiments thereof, it will be understood by those of ordinary skill in the art that various changes in forms and details may be made therein without departing from the spirit and scope of the following claims.

We claim:

1. A method of accessing a data storage device, the method comprising:
receiving an external multi-access command at the data storage device from a device external to the data storage device, the external multi-access command including a first address, a second address, a command identifier that identifies the external multi-access command for later matching with corresponding data, and a command-type indicator that designates a type as one of a single-access type and a multi-access type;
supplying a first access command based on the external multi-access command to a first nonvolatile memory, the first access command including the first address;
executing a first access operation on the first nonvolatile memory using the first access command and the first address;
supplying a second access command based on the external multi-access command to a second nonvolatile memory, the second access command including the second address; and
executing a second access operation on the second nonvolatile memory using the second access command and the second address.

2. The method of claim 1, wherein executing the first access operation and executing the second access operation are performed at the same time.

3. The method of claim 1,
wherein the external multi-access command is a multi-write command that includes write data as the corresponding data, and further comprising:
including a first part of the write data in the first access command; and
including a second part of the write data and not the first part of the write data in the second access command.

4. The method of claim 1,
wherein the external multi-access command is a multi-write command that includes write data as the corresponding data, and further comprising:
including all of the write data associated with the multi-write command in the first access command; and
including all of the write data associated with the multi-write command in the second access command.

5. The method of claim 1, wherein the external multi-access command is a multi-read command.

6. The method of claim 1, wherein the external multi-access command is a multi-erase command.

7. The method of claim 1, wherein the external multi-access command is received at the data storage device from a host.

8. The method of claim 7, wherein the external multi-access command is processed at a flash translation layer at the host.

9. The method of claim 1, further comprising:
converting the external multi-access command to the first access command and the second access command at the data storage device.

10. The method of 1, wherein:
the first address is a first physical address; and
the second address is a second physical address.

11. The method of claim 1, wherein:
the data storage device does not include a flash translation layer.

12. A multi-access method for a data storage device, the method comprising:
initiating a multi-access operation on a host device by generating a multi-access request;
performing a mapping operation on the multi-access request to generate a multi-access command, the multi-access command including a command identifier that identifies the multi-access command for later matching with corresponding data, a command-type indicator that designates a type as one of a single-access type and a multi-access type, a duplicate/split flag, and a plurality of addresses; and
sending the multi-access command from the host device to the data storage device.

13. The method of claim 12, wherein the plurality of addresses are physical addresses, and the multi-access request includes a logical destination address.

14. The method of claim 13, wherein the mapping operation maps the logical destination address to the plurality of physical addresses.

15. The method of claim 12, wherein the command-type indicator indicates one of: a multi-write command, a multi-read command, and a multi-erase command.

16. The method of claim 15, wherein the command-type indicator indicates a multi-write command, and the duplicate/split flag indicates that the corresponding data associated with the multi-access command should be written to each of two memory devices on the data storage device.

17. The method of claim 15, wherein the command-type indicator indicates a multi-write command, and the duplicate/split flag indicates that a first part of the corresponding data associated with the multi-access command should be written a first memory device of the data storage device and not a second memory device of the data storage device, and a second part of the corresponding data associated with the multi-access command should be written to the second memory device and not the first memory device.

18. A multi-access method for a data storage device including a management circuit and a plurality of nonvolatile memory devices, the multi-access method comprising:
receiving an external multi-access command from a device external to the data storage device, the external multi-access command including a command identifier that identifies the external multi-access command for later matching with corresponding data, a command-type indicator that designates a type as one of a single-access type and a multi-access type and at least a first address and a second address;
transmitting a first internal multi-access command based on the external multi-access command to a first nonvolatile memory device of the data storage device using the first address;
transmitting a second internal multi-access command based on the external multi-access command to a second nonvolatile memory device of the data storage device using the second address;
accessing the first nonvolatile memory device using the first address; and accessing the second nonvolatile memory device using the second address.

19. The multi-access method of claim 18, wherein:
accessing the first nonvolatile memory device using the first address occurs at the same time as accessing the second nonvolatile memory device using the second address.

20. The multi-access method of claim 18, wherein:
the external multi-access command is one of a multi-read command, a multi-write command, and a multi-erase command.

21. The multi-access method of claim 18, wherein:
the first address is a first physical address and the second address is a second physical address.

22. The multi-access method of claim 21, wherein:
the data storage device is a solid state drive that does not include a flash translation layer.

* * * * *